Jan. 7, 1964  G. R. CHAFEE, JR  3,116,983
ELECTRIC DRYER CONTROL CIRCUIT
Filed Oct. 30, 1961  3 Sheets-Sheet 1

INVENTOR.
GLENN R. CHAFEE JR.
BY
HIS ATTORNEY

United States Patent Office 3,116,983
Patented Jan. 7, 1964

3,116,983
ELECTRIC DRYER CONTROL CIRCUIT
Glenn R. Chafee, Jr., Louisville, Ky., assignor to General Electric Company, a corporation of New York
Filed Oct. 30, 1961, Ser. No. 148,573
8 Claims. (Cl. 34—45)

This invention relates to domestic clothes drying machines, and more particularly to a control system used in electric clothes dryers.

Electric clothes dryers, as sold for residential use, operate on either a three wire 220 volt system or a two wire 110 volt system. Usually it is ascertained in advance which of these two systems is to be used to supply the power to the dryer, and an appropriately connected dryer is then provided for the purpose. Each of the two systems has its own relative advantages. Thus, the 220 volt system permits the use of a substantially greater amount of power for a heat drying operation, and this greater amount of power permits the drying of the clothes to be effected rapidly. On the other hand, while the drying operation is a slower one when a 110 volt source of power is used, it is, for reasons well known to those skilled in the art, a substantially more efficient way to proceed. Thus, for speed a 220 volt system is best and for efficiency a 110 volt system is best.

Because of these two different aspects of the two different systems, it has in the past occurred that a dryer, if its heating elements could be wired through a manually operable switch for operation either on 220 volts or 110 volts, would provide a highly desirable alternative to the operator. If a fast operation was essential, the 220 volt source could be used, while for economy's sake, if there were no hurry (as where a drying cycle is started just before a family retires), the 110 volt system could be used. However the concept of such an alternative control system has been entirely limited to dryers of the type wherein the heating operation is a simple time controlled step, that is, the operator sets a timer for a predetermined amount of time, and at the end of that amount of time the dryer shuts off.

Despite its desirability, the concept has not been used in the type of dryer (marketed by many manufacturers) which provides an automatic cycle wherein, by sensing changes in the clothes temperature, the dryer shuts off automatically when the clothes have become dry. This approach is based essentially on the fact that, when a load of wet clothes is heated, the temperature of the air circulating through the clothes container will rise quite rapidly to a level where the energy absorbed by evaporation of the moisture substantially equals the energy input. At this point, the rapid temperature rise will cease and the temperature will remain almost steady for a period of time until the amount of moisture in the clothes has decreased to a very substantial extent. At this point, when the clothes are approaching dryness, there is insufficient moisture to be evaporated to absorb the amount of energy being put into the system, and therefore the temperature starts to rise again. Accordingly, it will be clear that at an appropriate point on this rise at the end of the so-called temperature plateau (or period of no temperature rise), the time has arrived that the clothes are dry and the dryer should be shut off by a thermostat. There are, of course, minor variations on this basic theme. For instance, since the only moisture which can be evaporated is that at the surface of the fabric, it may be necessary to have two or more trips of a control thermostat before all the moisture has been withdrawn from within the fabric and evaporated.

The temperature at which the energy absorption by evaporation almost equals the energy input differs substantially with many different factors including load, type of fabric, and particularly voltage since this is the basic factor determining the energy input. Especially in the case where the voltage differs to a substantial extent, the characteristics of the time versus temperature curve for different voltages are substantially different. This means, in the case of a dryer to provide an automatic cycle on either 110 or 220 volts, that either two entirely separate control thermostats must be provided—an expensive proposition which has been the main factor barring commercial use to date—or else that the single thermostat already provided must be made to serve a dual purpose. This latter course, which is substantially more economical but requires more ingenuity, is obviously the most desirable.

Accordingly, it is an object of my invention to provide a control circuit for an electric dryer wherein a dryer with a single control thermostat may be made to provide an automatic drying cycle either for a 110 volt supply system or a 220 volt supply system.

A further object of my invention is to provide a structure which, in addition to the goal described immediately hereinabove, further makes possible by a simple and economical addition to the circuit the provision of a damp drying cycle wherein the cycle will automatically end when the clothes are in a damp condition ready for ironing, rather than fully dried.

In one aspect of my invention, I provide my improved control circuit in a conventional fabric drying machine of the type which has a drying chamber with a main electric heater for supplying drying heat to fabrics in the chamber. The control circuit for the machine is adapted to be connected across a three wire source of power which includes first, second and third terminals: the first and second terminals are, conventionally, power terminals intended to be connected to the opposite sides of a 220 volt system, and the third terminal is the neutral terminal. That is, it is at ground voltage, with 110 volts drop between it and each of the other two terminals.

The control circuit includes means for automatically terminating energization of the main heater in response to a dry condition of the fabrics, including a single control thermostat positioned to sense temperature rises of fabrics and to trip at a predetermined high temperature; when the thermostat trips, it results in de-energization of the main heater. In order to vary the trip temperature of the thermostat for the purposes set forth above, I include a biasing electric heater which is connected between the second and third terminals. When the biasing heater is energized by the voltage between the second and third terminals the thermostat trips at a first fabric temperature, and by the same token, when the biasing heater is not energized the thermostat trips at a second fabric temperature. The main heater has one end connected to the first terminal, and its other end is connected to a two position manually operable switch, to which is also connected one end of the biasing heater. In its first position, this switch is connected either to the third, or neutral, terminal or to the second power terminal, and also to the other end of the biasing heater so as to short across it. In its second position, the switch is connected to the other of the second and third terminals.

Thus, in its first position the switch connects the main heater for energization on one voltage and in its second position the switch provides the other voltage for the main heater and energization for the biasing heater. It will be understood that by conventional design, with the structure set forth above, the correction provided by the biasing heater may be caused to be such that the trip temperature of the control thermostat will be correct both for the 110 volt operation and for the 220 volt operation.

In addition to the foregoing, I may provide a switch directly in series with the biasing heater so that the biasing heater may be eliminated from the circuit by opening this additional switch. In a system wherein energization of the biasing heater is provided during 220 volt operation to raise the trip temperature of the thermostat, the elimination of the biasing heater causes a relatively low trip temperature to be provided for the thermostat even though 220 volt operation is selected. This causes the clothes to be damp to a substantially pre-determined extent and thus, when this is caused to occur, the drying operation may be automatically terminated with the clothes in a damp condition where they are suitable for ironing without any further dampening being needed.

The subject matter which I regard as my invention is particularly pointed out and distinctly claimed in the concluding portion of this specification. My invention, however, both as to organization and method of operation together with further objects and advantages thereof, may best be understood by reference to the following description taken in conjunction with the accompanying drawings.

Figure 1:
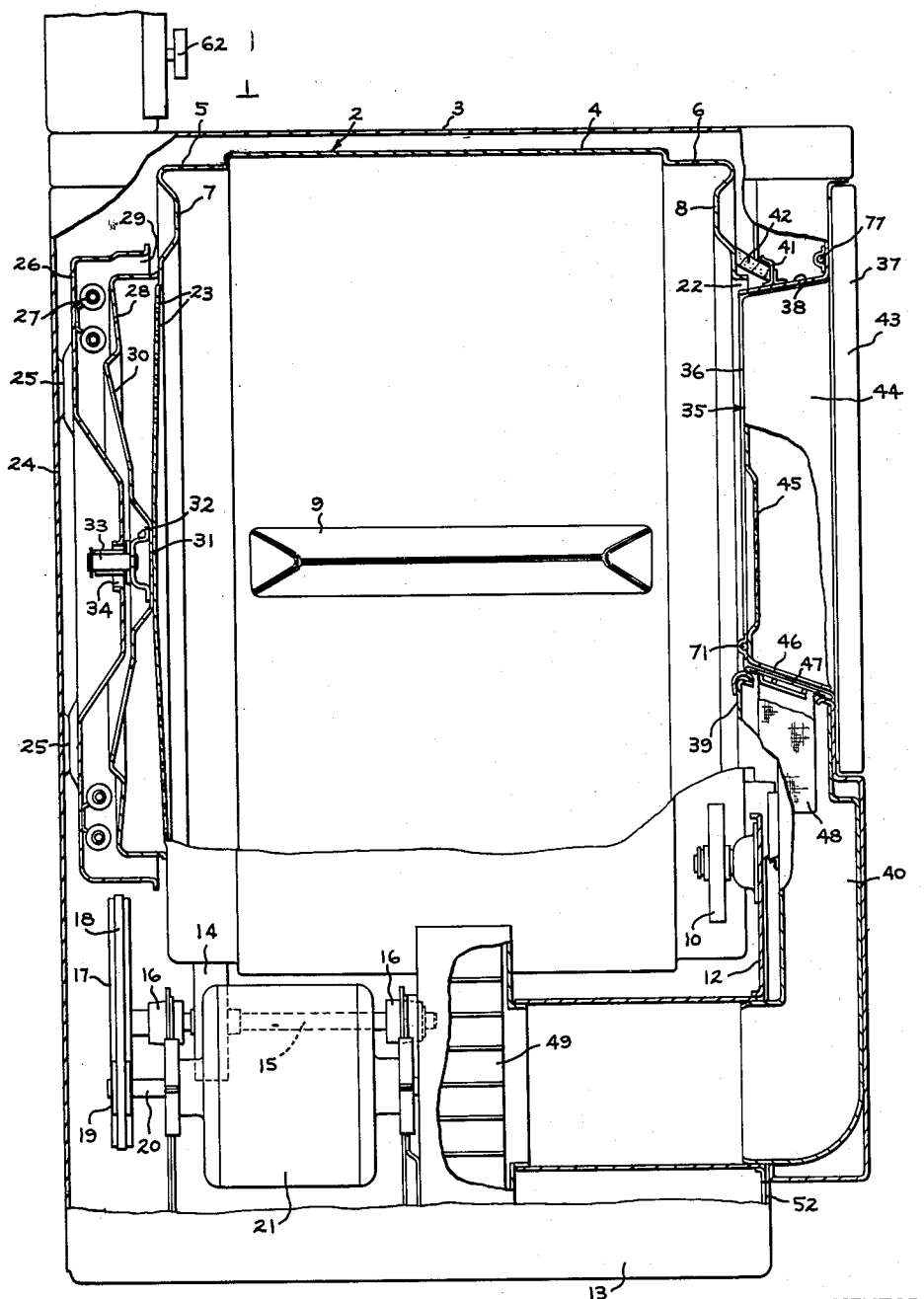
FIGURE 1 is a side elevational view of a clothes dryer incorporating my improved dryer control arrangement, the view being partly broken away and partly sectionalized in order to illustrate details.
Figure 2:
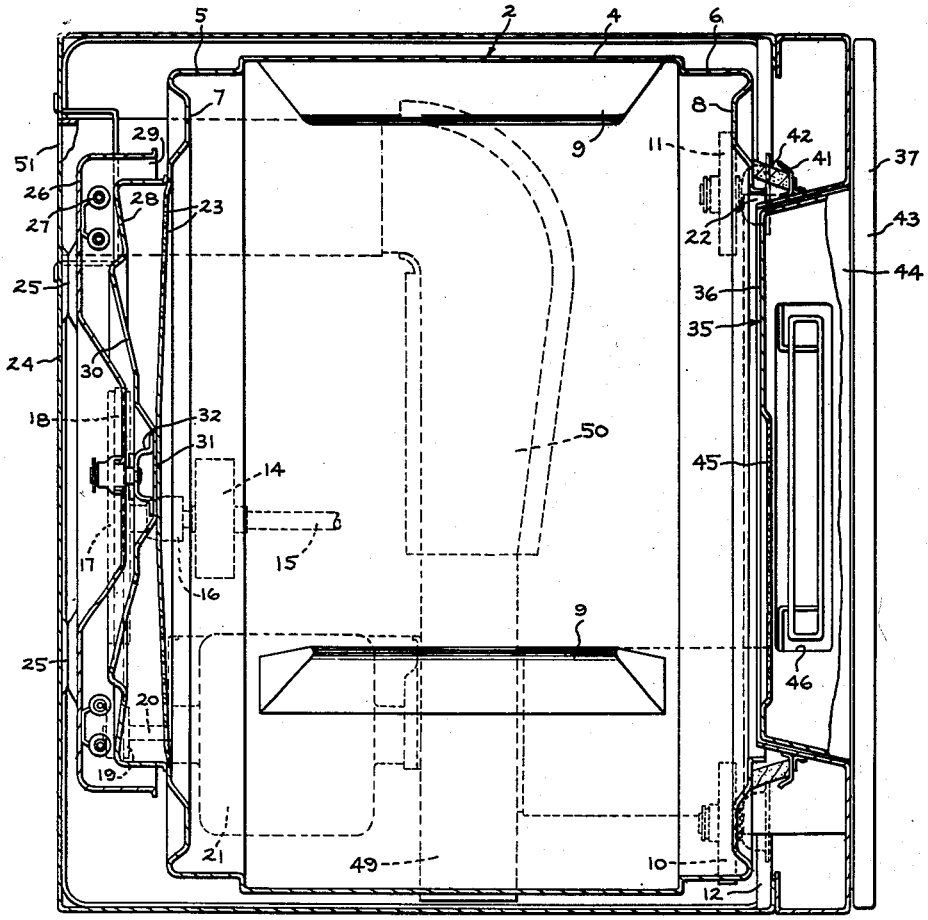
FIGURE 2 is a horizontal sectional view of the dryer, with certain surfaces broken away and partly sectionalized to illustrate further details.

Referring now to FIGURES 1 and 2, I have shown therein a domestic clothes dryer 1 including a clothes tumbling container or drum 2 provided with a suitable outer casing or cabinet 3 which completely encloses the drum on all sides. The drum is mounted for rotation within cabinet 3 on a substantially horizontal axis, and is generally cylindrical in shape, having a first outer wall portion 4, second and third outer wall portions 5 and 6 located respectively adjacent the ends of the drum, a back wall 7, and a front wall 8. Outer wall portions 4, 5, and 6 are imperforate over their entire length so that the entire outer shell of the basket is imperforate; on the interior surface of central portion 4 there is provided a plurality of clothes tumbling ribs 9.

The front of drum 2 is rotatably supported within the outer casing 3 by means of a pair of idler roller wheels 10 and 11 which are rotatably secured to the top of an upwardly extending member 12 secured at its bottom to the base 13 of the machine (FIGURE 1). Rollers 10 and 11 are disposed beneath the drum in contact with portion 6 thereof. The rear end of the drum receives its support from a roller wheel 14 which is positioned beneath portion 5 of the drum in supporting and frictionally driving engagement therewith.

Roller 14 is secured on a shaft 15 supported in bearings 16. Shaft 15 is secured to a pulley 17 driven from a belt 18 which in turn is powered by a pulley 19 mounted on the end of the shaft 20 of an induction type electric motor 21. The motor, pulleys and roller 14 are so proportioned to drum 2 and to each other that drum 2 is rotated by roller 14 at the appropriate speed to provide tumbling action for fabrics placed therein. In order that a stream of drying air be introduced into and passed through the clothes drum, the drum is provided with a central aperture 22 in its front wall 8 and with a plurality of perforations 23 extending in an annulus around back wall 7. Rigidly secured to the rear wall 24 of casing 3 by any desired means such as, for instance, welding at suitable points 25, is a baffle member 26 which has secured thereto heating means such as an electric heater 27 appropriately insulated from the baffle member.

Heater 27 may be annular in shape so as to be generally coextensive with perforations 23 in drum 2. A baffle member 28 is rigidly secured to the back wall 7 of the drum outside the ring of perforations 23 and within the stationary baffle 26 so that an annular air inlet 29 is in effect formed by the baffles 26 and 28. Baffle 28 is further provided with an annular series of openings 30. In this manner, a passage is formed for air to enter annular opening 29 between the baffles, pass over the heating elements 27, and through openings 30 and perforations 23 into the interior of drum 2.

In addition to the air guiding function, the baffles 26 and 28 help rollers 10, 11, and 14 to support the drum 2. Secured to the central portion 31 of baffle 28 is a bracket 32 to which in turn is secured a stub shaft member 33 substantially co-axially positioned relative to drum 2. The central portion of baffle 26 has a slot-like opening 34 formed therein. The slot is suitably formed (as is more fully described in copending application Serial No. 789,869, filed January 29, 1959, by William F. Simpson and assigned to the same assignee as this invention) so as to permit stub shaft 33 a limited amount of movement in the vertical direction but virtually no movement in the horizontal direction. Thus, the slight vertical motion of the drum which results from the tumbling of the clothes can be accommodated while at the same time undesirable horizontal motion is affirmatively prevented by engagement of stub shaft 33 in slot 34.

The front opening 21 of the drum is substantially closed by means of a stationary bulkhead generally indicated by the numeral 35. Bulkhead 35 is made up of a number of adjacent members including the inner surface 36 of an access door 37 mounted on the dryer cabinet, stationary frame 38 for the door, the inner surface 39 of an exhaust duct 40, and an annular flange 41 mounted on the frame 38 and on the duct wall. It will be noted that a suitable clearance is provided between the inner edge of the drum opening 22 and the edge of bulkhead 35 so that there is no rubbing between the drum and the bulkhead during rotation of the drum. In order to prevent any substantial air leakage through opening 22 between the interior and the exterior of the drum a suitable ring seal 42, preferably formed of felt-like material, is secured to flange 41 in sealing relationship with the exterior surface of drum wall 8.

Front opening 22, in addition to serving as part of the air flow path through the drum, also serves as a means whereby clothes may be loaded into and unloaded from the drum. The door 37, whose inner surface forms part of the bulkhead closing the opening, is mounted on cabinet 3; when the door is opened, clothes may be inserted into or removed from the drum through the door frame 38. It will be noted that the door includes an outer flat imperforate section 43 and an inwardly extending hollow section 44 mounted on the flat outer section. Hollow section 44 extends into the door frame 38 when the door is closed, and the door surface 36 which comprises part of the combination bulkhead 35 is actually the inner wall of the hollow section.

The air outlet from the basket is provided by a perforated opening 45 formed in the inner wall 36 of hollow door section 44. The bottom wall section of door 44 and the adjacent wall of door frame 38 are provided with aligned openings 46 and 47, opening 47 providing the entrance to duct 40. As shown, a lint trap 48, which may comprise a fine mesh bag, is preferably positioned in duct 40 at opening 47, the bag being supported by the door frame. Duct 40 leads to suitable air moving means which may, as shown, comprise a centrifugal blower 49 mounted on the motor shaft and thus driven directly by motor 21. The outlet of blower 49 communicates with an outlet duct 50 (FIGURE 2) which extends to an opening 51 in the back 24 of cabinet 3. During operation of motor 21, the rotation of blower 49 causes air to be drawn into cabinet 3 through a suitable opening 52 (FIGURE 1) provided at the front of the machine, through annular opening 29, over heater 27, through openings 30 and perforations 23 into drum 2, across the drum, through openings 45, 46 and 47 into duct 40, and then through the blower 49, outlet duct 50 and opening 51 back into the atmosphere.

Figure 3:
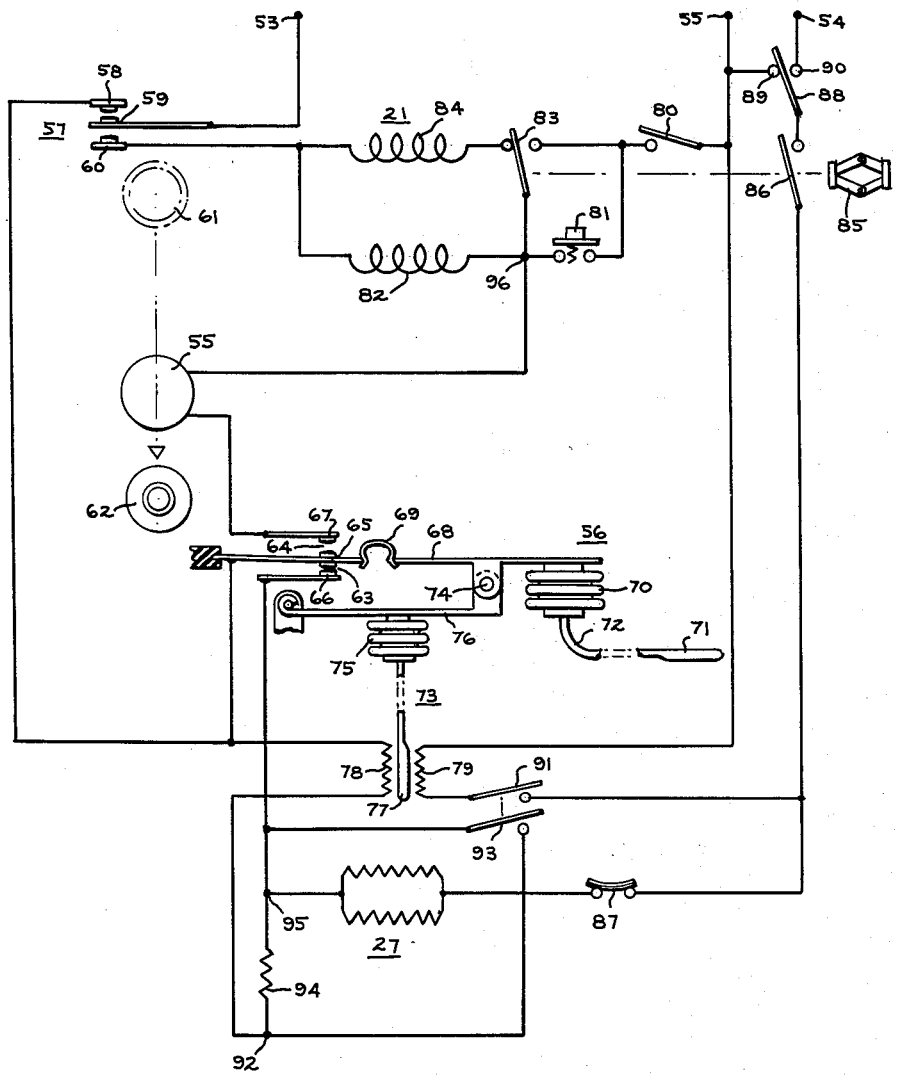
FIGURE 3 is a schematic illustration of my improved control system as used in the control of the drying machine of FIGURES 1 and 2.

The operation of dryer 1 is controlled by a new and improved control system as shown in the circuit diagram of FIGURE 3. As shown there, the entire control system of the machine may be energized across a three-wire power supply system intended to be connected to the three terminals 53, 54 and 55 provided in the control system. Terminals 53 and 54 will normally be connected across a 220 volt power supply, and terminal 55 will be connected to the third or neutral line so that 110 volts appear between the neutral terminal 55 and each of the power terminals 53 and 54.

The control system includes two principal control means in the form of a timer motor 55 and a single control thermostat generally indicated by the numeral 56. The timer motor 55, which is preferably of the synchronous type, is arranged for operating a switch 57 which includes three contacts 58, 59 and 60. Operation of the timer motor 55 causes rotation of a cam 61, and the cam is effective either to leave the switch 57 open, as shown, to close contacts 59 and 60 only, or to close all three contacts 58, 59 and 60 together. The timer motor 55 and its cam 61 may be manually adjusted by an operator control dial which is suitably connected to the cam by a one-way clutch (not shown) so that rotation of dial 62 may be used to move the cam 61 to the desired position to initiate a cycle by closing all the contacts of switch 57.

The control thermostat 56 operates a pair of switches. Specifically, it operates a heater switch 63 and a timer motor switch 64. It will be noted that the switches 63 and 64 share a common movable contact 65 which in its lower position closes the switch 63 and in its upper position closes the switch 64. In other words, the switch 63 comprises the movable contact 65 and a fixed contact 66, and the switch 64 comprises the movable contact 65 and the fixed contact 67.

The thermostat 56, which is shown in its closed position, operates the contact 65 and thus the two switches through a pivoted link 68. This link is connected at its one end to the movable end of the contact member 65 by means of a toggle spring 69 and at its other end is secured to an expansible fluid filled bellows element 70 of thermostat 56. Spring 69 operates in a manner well known to the art to move the contact arm 65 between its upper and lower positions with a snap action as the adjacent end of the arm 68 is moved upwardly and downwardly.

Thermostat 56, as shown, includes a sensing element or bulb 71 connected to the bellows 70 by a suitable line or tube 72. Bulb 71, as shown in FIGURE 1, is positioned at the front of the dryer on the bulkhead 35 directly below the air outlet opening 45 from the drum. Thus, the bulb 71 is effective to sense the temperature of the air leaving the drum, which temperature is close to the actual clothes temperature and varies substantially in the same manner as the clothes temperature varies.

The temperature at which bulb 71 causes the pressure within bellows 70 to change sufficiently to move switch arm 65 may be varied by means of a second auxiliary bulb and bellows assembly generally indicated by the numeral 73. Specifically, in the illustrated embodiment, the relationship is varied by the thermostat 73 moving the pivot point 74 of link 68 so that a higher or lower temperature is required within the dryer at the bulb 71 for the control thermostat 56 to operate the contacts. This arrangement (which is described and claimed in Patent 2,878,580, issued on March 24, 1959, to P. G. Hughes, and assigned to the General Electric Company, assignee of the present invention), may include a bellows member 75 which engages a link 76 arranged in controlling relationship to link 68 through pivot point 74. Thermostat 73 also includes a bulb 77 which may be positioned, as shown in FIGURE 1, directly behind door 37 so that it is affected to as small a degree as possible by temperature variations within the dryer.

A first biasing resistance heater 78 may be provided, positioned in intimate thermal relationship with bulb 77 so that energization of the heater 78 causes the bellows 75 to raise the pivot point 74 and in this manner, as more fully explained in the aforementioned Hughes patent, thereby raise the temperature at which the switch arm 65 will move from the position shown over to its other position so as to close switch 64. A second biasing resistance heater 79, which forms an important part of my invention, is also positioned in intimate thermal relationship with bulb 77 and, in the same manner as resistance heater 78, energization of heater 79 causes an increase in the temperature at which switch arm 65 snaps from the position shown over to the closed position for switch 64.

The drive motor 21 of machine 1 is energized between the neutral terminal 55 and power terminal 53. Beginning at the neutral terminal, the energizing circuit extends to motor 21 through a conventional switch 80 which may be arranged so as to be open when door 37 is opened and closed when the door is closed so as to prevent operation of the machine except when the door is closed. From switch 80, the circuit extends through a pushbutton start switch 81, whose connections and functions are fully explained and claimed in Patent 2,858,619, issued to Philip G. Hughes on November 4, 1958, and assigned to General Electric Company, assignee of the present invention. From switch 81, the circuit then extends to main winding 82 of the motor 21 and in parallel therewith through a switch 83 to the start winding 84 of the motor. It will be understood that switch 83 may be of the conventional centrifugally operated type which, as the motor comes up to speed, is moved to the right to disconnect winding 84 by the operation of a centrifugal mechanism schematically indicated at 85. The movement of switch 83 as the motor comes up to speed also provides a direct connection from switch 80 through switch 83 to winding 82 without the need for passing through switch 81, so that release of switch 81 does not affect further operation of the motor once it has started. From the windings 82 and 84 the circuit then extends to contact 60 of switch 57 and then through contact 59 to terminal 53. Thus, when switches 80 and 57 are closed and switch 81 is manually depressed, the motor windings will become energized and the motor will come up to speed so that switch 83 moves to a position where it provides a bypass around switch 81; the motor then continues in operation on the main winding alone.

The centrifugal mechanism 85 also controls a switch 86, causing it to close as the motor comes up to speed. When this switch closes, it enables completion of an energizing circuit for the main heater 27 as follows: starting at power terminal 53, the main heater circuit extends through contacts 59 and 58 of switch 57, then through the movable contact 65 of the thermostat assembly and contact 66 of switch 63, then through the main heater itself, and a safety thermostat 87 to the centrifugal switch 86. The circuit then passes through a manually operable switch 88 which in its first position, as shown, engages a contact 89 and in its second operative position engages a contact 90. When switch 88 engages contact 89, the main heater is connected between power terminal 53 and neutral terminal 55, whereas when switch 88 engages contact 90 the heater is energized between the two power terminals 53 and 54. Thus, the switch 88 selects whether the heater will be energized across 110 volts or across 220 volts.

In the first position shown, the switch 88 performs the additional function of shorting across the biasing heater 79. In other words, it can readily be seen that the biasing heater 79 is connected to be energized across terminals 55 and 54, the circuit passing from terminal 55 to the biasing heater, and then through a switch 91, and switches 86 and 88. When switch 88 is in the position shown, the biasing heater is shorted out and is not energized. However, when switch 88 is in its second position the biasing heater is energized across terminals 54 and 55.

The biasing heater 78 is connected to terminal 53 at one end thereof through the switch 57. The other end of heater 78 is connected to a junction point 92 from which there are two parallel paths for the circuit; it may either pass through a switch 93 which is ganged with switch 91 for a purpose to be hereinafter described, so that both switches are opened and closed at the same time, or the circuit may pass through a resistor 94. In either event, the biasing heater 78 is connected through one or the other of these paths to the point 95, so that the circuit then continues through the main heater 27 and then through the switches 86 and 88 as previously described. It can thus be seen that heater 78 is energized through a circuit which passes through the main heater 27, either including resistor 94 or bypassing the resistor 94 through switch 93. Of course, when the main heater is energized through the thermostat switch 63, the heater 78 is shorted out. In other words, the only time that the heater 78 will operate is when the thermostat 56 has caused switch 64 to be closed and switch 63 to be opened.

Completing the description of the control circuit of FIGURE 3, the timer motor 55 is connected at one end to contact 67 and at its other end to a junction point 96, so that during running of motor 21 point 96 may be connected through switches 83 and 80 to the terminal 55. The other side of the timer motor 55 is connected through switch 64, when it is closed, and the switch 57 to terminal 53 to permit energization of the timer motor.

It will be recalled that, as described above, when heater 27 is energized the temperature first rises sharply, then reaches a sort of plateau during which it rises very little, and then, when most of the surface moisture on the clothes has been evaporated starts to rise rapidly again. For one type of automatic drying, the thermostat 56 is intended to trip, the first time at least, at a temperature which is slightly above the plateau. At this temperature a single trip of the thermostat will indicate dryness for certain light synthetic fabrics so that the cycle for practical purposes may be ended at that point. However, when the thermostat 56 is calibrated in this manner, medium and heavy fabrics are not dry at this first trip of the thermostat because, although the surface moisture has been evaporated, there is a substantial amount of moisture still within the fabrics and thus additional drying time is needed for them. For this reason, it is made possible through dial 62 to set the timer motor 65 to run for varying periods of time depending upon whether light, regular or heavy fabrics are to be dried with the calibration described for thermostat 56.

With the arrangement shown, once the timer motor 55 has been set by means of dial 62, and button 81 is depressed, the motor 21 will start in operation and heaters 27 will be energized either on 110 volts or on 220 volts depending upon the position of switch 88. When the thermostat 56 trips because the trip temperature thereof is reached, the switch 64 closes to start operation of timer 65 at the same time that switch 63 opens to de-energize the main heater 27. The timer then runs until the thermostat cools sufficiently to reset, at which time the heater is re-energized and the timer is de-energized. Thus, depending upon how long the timer is set for before it terminates the drying operation, one or more heating operations will be provided, with each heating operation terminating in the tripping of thermostat 56.

After the cam 61 has been rotated by motor 55 to a predetermined position, it opens contacts 58, 59 and 60, and thereby de-energizes all components of the machine to terminate the drying sequence.

For synthetics, the timer will conventionally be set to a position which will normally provide only one trip of the thermostat before the timer tolls the complete sequence, while for other fabrics two or more trips of the thermostat may be provided by setting an increased running time for the timer. This method of providing an automatic drying sequence is well known and is described and illustrated, for instance, in the aforementioned Hughes Patent 2,878,580.

Also described in the same Hughes patent is the function of biasing heater 78. This heater is de-energized when the main heater is energized by virtue of the fact that it is bypassed through closed switch 63. However, when switch 63 opens and switch 64 closes because thermostat 56 has tripped, a circuit is then completed through the heater 78. Because it has a much higher resistance than the main heater with which it is in series (for instance 4,000 ohms to 10 ohms) the biasing heater 78 is energized when the timer motor runs and the main heater is de-energized. As previously explained this energization of the biasing heater 78 raises the trip temperature of thermostat 56 so that if the timer is set to give more than one heating cycle, the trip the second time will be at a second higher temperature.

As previously mentioned, the plateau temperature zone is entirely different in a 110 volt drying operation from what it is in a 220 volt drying operation. Thus, for instance, a suitable first trip temperature for the thermostat 56 in a 220 volt drying operation is 110° F. to 150° F. while for 110 volts the thermostat 56 should trip at 80° F. to 120° F. (the range being a result of the ambient temperature compensating system described above). As an important part of my invention, the setting of switch 88 selects either 110 volts or 220 volts, and also automatically provides a correction factor for the thermostat so that the correct trip temperature is provided regardless of the voltage used for energizing the system. When the switch 88 is in the position shown, the heater 27 is energized at 110 volts as previously described. In addition, as also previously mentioned, this position of switch 88 provides a short circuit across biasing heater 79 so that the biasing heater 79 is not energized. As a result, a trip temperature is provided for the thermostat 56 which is influenced only by heater 78 if there is more than one thermostat trip.

However, if a 220 volt drying operation is desired, the switch 88 is moved to the right into engagement with contact 90. Since the biasing heater 79 is normally connected between terminals 54 and 55, it then becomes energized by virtue of the fact that switch 88 is no longer short circuiting it, and acts to raise the trip temperature of thermostat 56 as previously described. The calibration of the biasing heater 79 is such that it raises the trip temperature of thermostat 56 a predetermined amount to the temperature which is appropriate for 220 volts automatic dry.

Thus, the arrangement shown provides, by use of switch 88 in cooperation with the remainder of the circuit, not only a selection of voltages for drying but also a correction factor which automatically causes the single control thermostat to be compensated appropriately so as to provide correct automatic drying for both voltages.

With the system described above, there is, in addition to the automatic drying on both 110 volts and 220 volts, a damp drying cycle which may be selected. This may be effected by manually opening the switches 91 and 93 and moving the switch 88 to its right hand position. The position of switch 88 causes a 220 volt operation and normally enables the biasing heater 79 to be energized so that it will raise the trip temperature of thermostat 56 to provide correctly dry clothes at the end of the cycle. However, the opening of switch 91 prevents such energization, so that the drying operation is provided at 220 volts but with the trip temperature of thermostat 56 in the range normally used for 110 volts. With this combination of circumstances, the trip temperature actually falls below the plateau temperature, and the result of this is that the operation is terminated with the clothes in a somewhat damp condition. This is highly useful where it is desired to iron the clothes after they are removed from the dryer, without need for any further preparation of the clothes.

Where, as proposed in the present case, the biasing heater 78 is provided, it may also be desirable to decrease its effectiveness when damp drying is intended and for this purpose the switch 93 is also opened. When switch 93 is opened, then, during the periods when the timer 55 runs because switch 64 is closed and switch 63 is open, the biasing heater 78 has in series therewith the additional resistor 94 which may be on the order of 10,000 ohms, and which therefore causes substantially decreased effectiveness of the biasing heater 78. This further insures the provision of damp clothes at the end of the drying cycle by preventing a substantial rise in the trip temperature of thermostat 56 even if several trips of the thermostat should be provided.

Thus, in summary, it will be seen from the foregoing that my invention provides an economical and effective system for providing automatic drying cycles regardless of whether the fast operation on 220 volts is desired or an economical operation on 110 volts is desired. Also, it provides automatically a damp dry cycle where the drying operation will be terminated with the clothes in a damp condition.

While in accordance with the patent statutes I have described what at present is considered to be the preferred embodiment of my invention, it will be obvious to those skilled in the art that various changes and modifications may be made therein without departing from the invention. As an example, but without any intent to exclude other possible modifications, while I have a system wherein the biasing heater 79 when energized causes a rise in the trip temperature of the main control thermostat, it is well known to those skilled in the art that biasing heaters may be used so that when they are energized they decrease the trip temperature of a thermostat; such a structure would be entirely appropriate for use in my novel system, with the only needed modifications in this case being that the biasing heater 79 be positioned to heat bulb 71, and that it be energized by switch 83 during 110 volt operation and de-energized during 220 volt operation. Thus, it is aimed in the appended claims to cover all such equivalent variations, typified by the foregoing specified modifications, as fall within the true spirit and scope of my invention.

What I claim as new and desire to secure by Letters Patent of the United States is:

1. In a fabric drying machine having a drying chamber and a main electric heater for supplying drying heat to fabrics in said chamber: a control circuit adapted to be connected across a three-wire source of power including first, second and third terminals, said first and second terminals being power terminals and said third terminal being a neutral terminal, said main heater having one end thereof connected to said first terminal; means for automatically terminating energization of said main heater in response to a dry condition of the fabrics including a control thermostat positioned to sense temperature rises of fabrics and to trip at a predetermined high temperature, said main heater being de-energized in response to tripping of said thermostat; means for varying the trip temperature of said thermostat including a biasing electric heater connected between said second and third terminals, said thermostat tripping at a first fabric temperature when said biasing heater is energized and at a second fabric temperature when said biasing heater is not energized; and two-position manually operable switch means connected to the other end of said main heater and to one end of said biasing heater, said switch means in its first position being connected to one of said second and third terminals and to the other end of said biasing heater, said switch means in its second position being connected to the other of said second and third terminals.

2. In a fabric drying machine having a drying chamber and a main electric heater for supplying drying heat to fabrics in said chamber: a control circuit adapted to be connected across a three-wire source of power including first and and second power terminals and a neutral terminal, said main heater having one end thereof connected to said first power terminal; means for automatically terminating energization of said main heater in response to a dry condition of the fabrics including a control thermostat positioned to sense temperature rises of fabrics and to trip at a predetermined high temperature, said main heater being de-energized in response to tripping of said thermostat; means for varying the trip temperature of said thermostat including a biasing electric heater connected between said second power terminal and said neutral terminal, said thermostat tripping at a higher fabric temperature when said biasing heater is energized and at a lower fabric temperature when said biasing heater is not energized; and two-position manually operable switch means connected to the other end of said main heater and to one end of said biasing heater, said switch means in its first position being connected to said neutral terminal and to the other end of said biasing heater, said switch means in its second position being connected to said second power terminal.

3. A fabric drying machine having a drying chamber and a main electric heater for supplying drying heat to fabrics in said chamber: a control circuit adapted to be connected across a three-wire source of power including first, second and third terminals, said first and second terminals being power terminals and said third terminal being a neutral terminal, said main heater having one end thereof connected to said first terminal; means for automatically terminating the energization of said main heater in response to a dry condition of the fabrics including a control thermostat positioned to sense temperature rises of fabrics and to trip at a predetermined high temperature, and a timer including a timer motor connected for energization across two of said terminals, said main heater being energized and said timer motor being de-energized when said thermostat is in its untripped condition, said main heater being de-energized and said timer being energized in response to tripping of said thermostat; means for varying the trip temperature of said thermostat including a biasing electric heater connected between said second and third terminals, said thermostat tripping at a first fabric temperature when said biasing heater is energized and at second fabric temperature when said biasingn heater is not energized; and two-position manually operable switch means connected to the other end of said main heater and to one end of said biasing heater, said switch means in its first position being connected to one of said second and third terminals and to the other end of said biasing heater, said switch means in its second position being connected to the other of said second and third terminals.

4. The apparatus defined in claim 3 including a second biasing heater connected to be energized and de-energized concurrently with said timer motor, said second biasing heater being arranged so that when energized it causes the trip temperature of said thermostat to be increased.

5. In a fabric drying machine having a cylindrical fabric drying drum rotatable on a non-vertical axis, a main electric heater for supplying drying heat to fabrics in said drum, and air moving means for passing air through said drum: a control circuit adapted to be connected across a three-wire source of power including first, second and third terminals, said first and second terminals being power terminals and said third terminal being a neutral terminal, said main heater having one end thereof connected to said first terminal; an electric motor arranged to be connected across two of said terminals for energization, said motor being connected to rotate said chamber at a speed to tumble fabrics therewithin and to operate said air moving means; means for automatically terminating energization of said main heater in response to a dry condition of the fabrics including a control thermostat positioned to sense temperature rises of fabrics and to trip at a predetermined high temperature, said main heater being de-energized in response to tripping of said thermostat; means for varying the trip temperature of said thermostat including a biasing electric heater connected between said second and third terminals, said thermostat tripping at a first fabric temperature when said biasing heater is energized and at a second fabric temperature when said biasing heater is not energized; and two-position manually operable switch means connected to the other end of said main heater and to one end of said biasing heater, said switch means in its first position being connected to one of said second and third terminals and to the other end of said biasing heater, said switch means in its second position being connected to the other of said second and third terminals.

6. The apparatus defined in claim 5 including means for continuing energization of said motor for a predetermined period after energization of said main heater has terminated, and then terminating energization of said motor.

7. The apparatus defined in claim 2 including a second manually operable switch in series with said biasing heater for disconnecting said biasing heater regardless of the position of said two-position manually operable switch means, thereby to cause termination of main heater energization with the clothes still in a damp condition when said main heater is connected across said power terminals.

8. In a fabric drying machine having a drying chamber and a main electric heater for supplying drying heat to the fabrics in said chamber: a control circuit adapted to be connected across a three-wire source of power including first and second power terminals and a neutral terminal, said main heater having one end thereof connected to said first terminal; means for automatically terminating energization of said main heater in response to a dry condition of the fabrics including a control thermostat positioned to sense temperature rises of fabrics and to trip at a predetermined high temperature, and a timer assembly for terminating a drying sequence after a predetermined period of timer assembly operation including a timer motor arranged to be energized across two of said terminals, said thermostat energizing said main heater and de-energizing said timer motor in its untripped condition and causing de-energization of said main heater and energization of said timer motor upon tripping; means for varying the trip temperature of said thermostat including a first biasing electric heater connected between said second power terminal and said neutral terminal, said thermostat tripping at a higher fabric temperature when said first biasing heater is energized and at a lower fabric temperature when said biasing heater is not energized; two-position manually operable switch means connected to the other end of said main heater and to one end of said first biasing heater, said two-position switch means in its first position being connected to said neutral terminal and to the other end of said biasing heater, said two-position switch means in its second position being connected to said second power terminal; a second manually operable switch positioned in series with said first biasing heater and arranged to provide for opening of said first biasing heater regardless of the position of said two-position manually operable switch means; a second biasing heater arranged to be energized and de-energized concurrently with said timer motor; a resistor in series with said second biasing heater; and a third manually operable switch arranged to short out said resistor when closed, said second and third switches being connected to be opened and closed concurrently with each other.

References Cited in the file of this patent
UNITED STATES PATENTS

| | | |
|---|---|---|
| 2,863,224 | Zehrbach | Dec. 9, 1958 |
| 2,878,580 | Hughes | Mar. 24, 1959 |